(12) United States Patent
Dykstra et al.

(10) Patent No.: US 10,934,813 B2
(45) Date of Patent: Mar. 2, 2021

(54) METHOD TO OPTIMIZE OILFIELD OPERATIONS BASED ON LARGE AND COMPLEX DATA SETS

(71) Applicant: Halliburton Energy Services, Inc., Houston, TX (US)

(72) Inventors: Jason D. Dykstra, Spring, TX (US); Zhijie Sun, Spring, TX (US); Yuzhen Xue, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 422 days.

(21) Appl. No.: 15/541,607

(22) PCT Filed: Mar. 5, 2015

(86) PCT No.: PCT/US2015/018947
§ 371 (c)(1),
(2) Date: Jul. 5, 2017

(87) PCT Pub. No.: WO2016/140676
PCT Pub. Date: Sep. 9, 2016

(65) Prior Publication Data
US 2017/0342808 A1    Nov. 30, 2017

(51) Int. Cl.
*E21B 41/00* (2006.01)
*E21B 44/00* (2006.01)
(Continued)

(52) U.S. Cl.
CPC .......... *E21B 41/0092* (2013.01); *E21B 44/00* (2013.01); *E21B 44/005* (2013.01);
(Continued)

(58) Field of Classification Search
CPC .... E21B 41/0092; E21B 44/00; E21B 44/005; E21B 44/006; G05B 18/0405; G06F 17/50; G06F 17/5009; G06F 30/00; G06F 30/13
See application file for complete search history.

(56) References Cited

U.S. PATENT DOCUMENTS 7,172,037 B2    2/2007  Dashevskiy et al.
8,775,141 B2    7/2014  Raphael
(Continued)

OTHER PUBLICATIONS

International Preliminary Report on Patentability issued in related PCT Application No. PCT/US2015/018947, dated Sep. 14, 2017 (6 pages).
(Continued)

*Primary Examiner* — Omar F Fernandez Rivas
*Assistant Examiner* — Joshua E. Jensen
(74) *Attorney, Agent, or Firm* — Benjamin Ford; Baker Botts L.L.P.

(57) ABSTRACT

In some aspects, the present invention comprises a system and method for optimizing the control scheme used for drilling operations based on the complex and large data sets available in realtime during operation of a wellsite and based on existing model data available at the wellsite for past similar drilling operations. Such optimizations typically require downtime to quantify how the realtime values will factor into the control model, but the present invention allows for such optimization in realtime in a closed-loop system that will reduce the non-productive time associated with reservoir operations.

21 Claims, 6 Drawing Sheets

(51) Int. Cl.
*E21B 44/06* (2006.01)
*G05B 19/04* (2006.01)

(52) U.S. Cl.
CPC .......... *E21B 44/06* (2013.01); *G05B 19/0405* (2013.01); *G05B 2219/36252* (2013.01)

(56) References Cited

U.S. PATENT DOCUMENTS

| | | | |
|---|---|---|---|
| 2006/0118170 A1* | 6/2006 | Dykstra | G05D 24/02 137/92 |
| 2007/0029112 A1 | 2/2007 | Li et al. | |
| 2008/0035334 A1 | 2/2008 | Newman | |
| 2009/0182541 A1 | 7/2009 | Crick et al. | |
| 2009/0225630 A1 | 9/2009 | Zheng et al. | |
| 2011/0153622 A1 | 6/2011 | Bhattal et al. | |
| 2011/0161133 A1 | 6/2011 | Staveley et al. | |
| 2011/0174541 A1* | 7/2011 | Strachan | E21B 44/00 175/27 |
| 2012/0253770 A1* | 10/2012 | Stern | G01V 11/00 703/10 |
| 2014/0040340 A1* | 2/2014 | Shimizu | H03H 17/0294 708/311 |
| 2014/0116776 A1 | 5/2014 | Marx et al. | |
| 2014/0182841 A1 | 7/2014 | Lecerf et al. | |
| 2014/0262246 A1* | 9/2014 | Li | E21B 21/08 166/250.08 |
| 2015/0081222 A1* | 3/2015 | Laing | E21B 45/00 702/9 |

OTHER PUBLICATIONS

Staveley, Catheryn, and Paul A. Thow. "Increasing drilling efficiencies through improved collaboration and analysis of real-time and historical drilling data." SPE Intelligent Energy Conference and Exhibition. Society of Petroleum Engineers, 2010.

Dow, B., R. Harmer, and J. Belaski. "Special Focus: Drilling and Well Completion Technology—Improving drilling results with a real-time performance advisory system." World Oil (2012): 39. Available at https://www.slb.com/~/media/Files/drilling/industry_articles/201206_wo_realtime_drilling.pdf.

Baaziz, Abdelkader, and Luc Quoniam. "How to use Big Data technologies to optimize operations in Upstream Petroleum Industry." (2014).

International Search Report and Written Opinion issued in related PCT Application No. PCT/US2015/018947 dated Nov. 24, 2015, 8 pages.

Examiner's Letter issued in related Canadian application No. 2971706, mailed Apr. 13, 2018 (5 pages).

Examiner's Letter issued in related Canadian application No. 2971706, mailed Mar. 22, 2019 (5 pages).

\* cited by examiner

METHOD TO OPTIMIZE OILFIELD OPERATIONS BASED ON LARGE AND COMPLEX DATA SETS

CROSS-REFERENCE TO RELATED APPLICATION

The present application is a U.S. National Stage Application of International Application No. PCT/US2015/018947 filed Mar. 5, 2015, which is incorporated herein by reference in its entirety for all purposes.

BACKGROUND

The present invention relates to a software for improving methods and systems for utilizing large and complex data sets to optimize oilfield operations by determining an appropriate model and associating a control operation for the reservoir operation.

With the advent of mass data storage technology, databases at the wellsite can store the data associated with the operation at the wellsite of the reservoir operation. The resulting data may form a large and complex data set, the interpretation and analysis of which may improve the operation of the reservoir. Traditionally, this data may either be sent off-site for storage and later evaluation into a model. The data may include macro-scale information, such as the location of the wellsite. The data may also include micro-scale information, such as information obtained regarding the reservoir operation. This may include the torque applied to drill string, the weight on bit and the rate of penetration during a drilling job, the cement slurry rate and the density of cement during a cementing job, and the flow rate into each perforation during a fracturing job.

Because the large data set of the reservoir may be relevant with the identification and improvement of the modelling process, it may be desirable to identify a more optimized manner of using the large complex data sets from the reservoir operation to optimize the control operation of the reservoir operation.

Because of the various complexities and processes involved with reservoir operation, there can be many factors that may be used to determine the control operation. As the process progresses, for example, in a fracturing operation, the current formation may require a different control strategy based on the identification of the parameters of the existing formation. However, though the massive amount of data regarding the reservoir operation may be available, it may require stopping operation and manual evaluation of the parameters to determine how to modify the control strategy for the reservoir operation to optimize the process for the reservoir operation.

Thus, there is a need for a software system without these limitations which optimizes the control for a reservoir operation by identifying the appropriate model and controller for a reservoir operation for drilling, completion and stimulation, from a database consisting of previous and current job data. The following description resolves these and other limitations by describing a software system for optimized identification of control for use in reservoir production. The use of realtime data enables models for controlling drilling operations to identify optimal strategies for controlling the reservoir operation.

Figure 1:
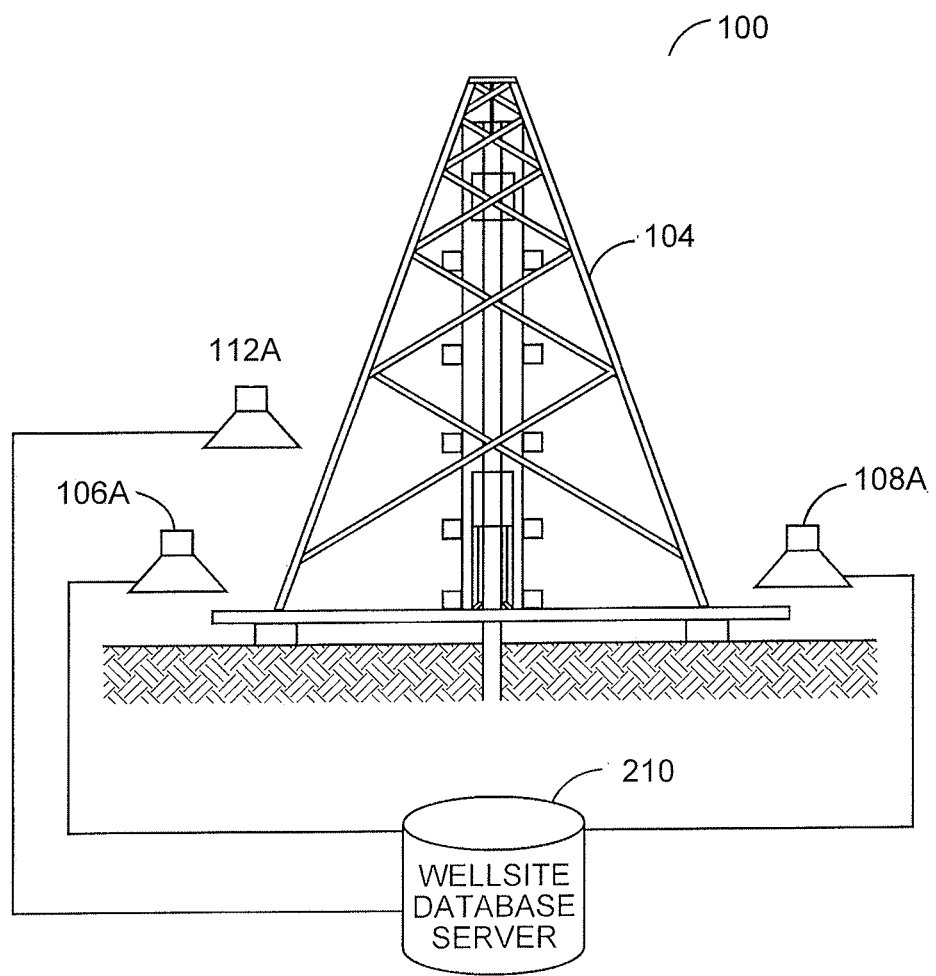
FIG. 1 is an illustrative wellsite system of the invention.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present application is directed to optimizing the control operation of reservoir and drilling operation during drilling using operation data in realtime along with known models for operation. The data necessary to identify an optimized control operation may include data from the current reservoir operation and data from previous similar reservoir operation that may be stored remotely. With the present application, automation may be used to collect, view, process, correlate, and store the data associated with a particular reservoir operation. In particular, software functions in accordance with the present invention can automate and optimize the process of identifying a control system that optimizes the drilling operation at the reservoir.

In certain embodiments according to the present disclosure, identifying the optimal control for the drilling process may involve collecting the data from a reservoir operation. Such data may be inserted in a model generator, along with known parameters and models with respect to the reservoir operation, and identify a set of models that may be used to control the drilling operation. To determine which of the models to use to continue to the drilling operation, the model control (i.e., a controller is designed based on the control model) can be compared to a performance criteria (such as eigenvalue drift as described below) to identify the performance of the model and control operation.

For a linear system with linear controller, the eigenvalues of the system is always fixed. However, for a nonlinear system, the eigenvalues of the system may drift depending on the controller and operating point. A good controller may control the system very well, leading to smaller variation of the eigenvalues. On the contrary, the system may have large variations as a result of bad controller, leading to large drift of eigenvalues.

The control operation may thus use the current drilling parameters and realtime data as well as past models that have been identified as appropriate models for the drilling operation, and the use of both of these features enables an optimized control for the drilling operation.

These software functionalities may be introduced into existing control software for reservoir operations, thereby automating and optimizing the process and efficiencies for a drilling operation to improve the reservoir operation.

With reference to the attached figures, certain embodiments of the present invention include a system 100 that may include a wellsite 104 and a wellsite database server 210 that couples together information handling systems (IHS) 106A, 108A, and 112A that may collect, process, store, correlate, and display various wellsite data and real time operating parameters. The IHS 106A, 108A, and 112A for example, may receive wellsite data from various sensors at the wellsite, including downhole and surface sensors. Additional IHS may also be present (not picture) and the present invention is not intended to limit the number of IHS at a wellsite.

Figure 2:
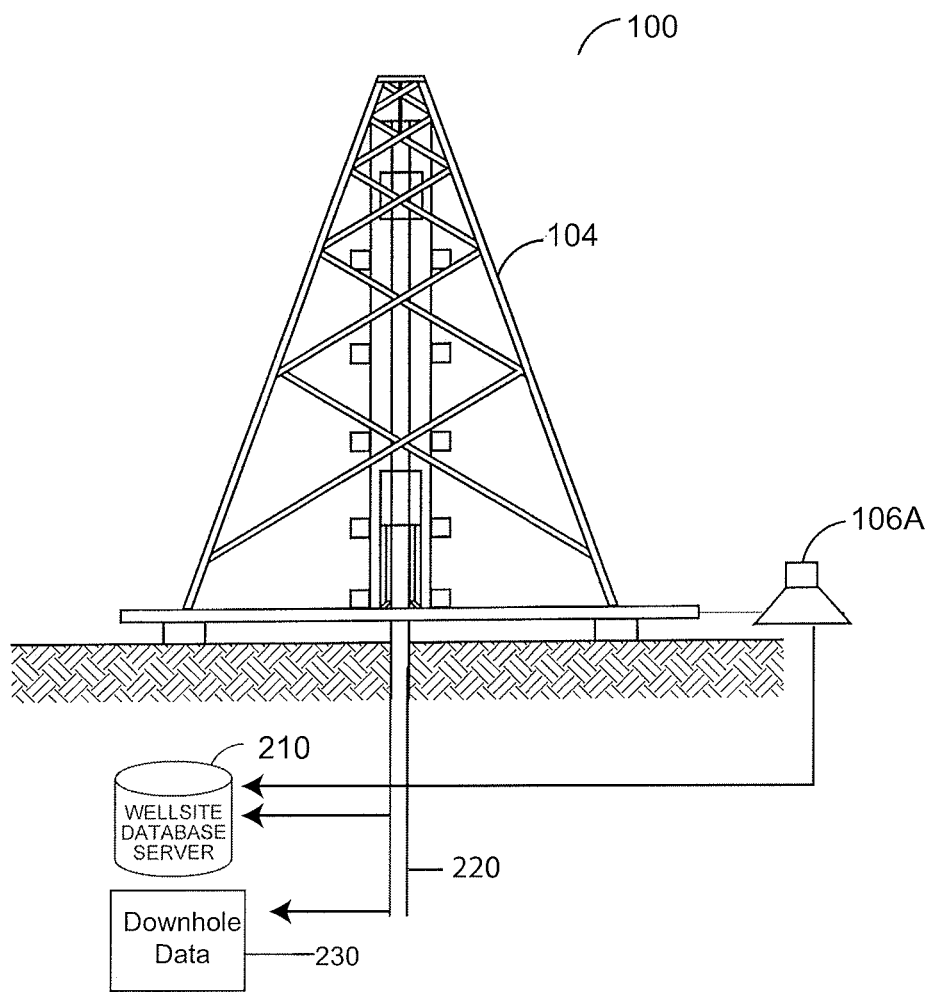
FIG. 2 shows another illustrative wellsite system of the invention.

FIG. 2 of the present invention includes a further description of the system 100 including a wellsite database server 210 that contains information associated with the wellsite 104. Moreover, the wellsite database server may store data collected from the various sensors at the wellsite in realtime. Such data may further include downhole data 230 collected from bottom hole assembly (BHA) 220. The wellsite database server 210 may also contain data from a previous wellsite operation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

In an illustrative embodiment, the IHS may include an integrated control system 310 for the wellsite data. The wellsite data may be replicated at one or more remote locations relative to the wellsite. The integrated control system may transmit data via network (not shown) and radio frequency transceivers to remote locations.

The network communication may be any combination of wired and wireless communication. In one example, at least a portion of the communication is transferred across the internet using TCP/IP internet protocol. In some embodiments, the network communication may be based on one or more communication protocols (e.g., HyperText Transfer Protocol (HTTP), HTTP Secured (HTTPS), Application Data Interface (ADI), Well Information Transfer Standard Markup Language (WITSML), etc.). A particular non-volatile machine-readable medium 108 may store data from one or more wellsites and may be stored and retrieved based on various communication protocols. The non-volatile machine-readable media 108 may include disparate data sources (such as ADI, Javi Application Data Interface (JADI), Well Information Transfer Standard Markup Language (WITSML), Log ASCII Standard (LAS), Log Information Standard (LIS), Digital Log Interchange Standard (DLIS), Well Information Transfer Standard (WITS), American Standard Code for Information Interchange (ASCII), OpenWorks, SiesWorks, Petrel, Engineers Data Model (EDM), Real Time Data (RTD), Profibus, Modbus, OLE Process Control (OPC), various RF wireless communication protocols (such as Code Division Multiple Access (CDMA), Global System for Mobile Communications (GSM), etc.), Video/Audio, chat, etc.). While the system 100 shown in FIG. 1 employs a client-server architecture, embodiments are not limited to such an architecture, and could equally well find application in a distributed, or peer-to-peer, architecture system.

FIG. 2 illustrates an information handling system (IHS) 106A, 108A, 112A that may be used for accessing the wellsite database server for use in optimizing drilling operations, according to some embodiments. In the example shown, the IHS 106A, 108A, 112A may include one or more processors. The IHS 106A, 108A, 112A may include a memory unit, processor bus, and an input/output controller hub (ICH). The processor(s), memory unit, and ICH may be coupled to the processor bus. The processor(s, memory unit, and ICH may be coupled to the processor bus. The processor(s) may include any suitable processor architecture. IHS 106A, 108A, 112A may include one or more processors, any of which may execute a set of instructions in accordance with embodiments of the invention.

The memory unit may store data and/or instructions, and may include any suitable memory, such as a dynamic random access memory (DRAM). IHS 106A, 108A, 112A may also include hard drives such as IDE/ATA drive(s) and/or other suitable computer readable media storage and retrieval devices. A graphics controller may control the display of information on a display device, according to certain embodiments of the invention.

Figure 3:
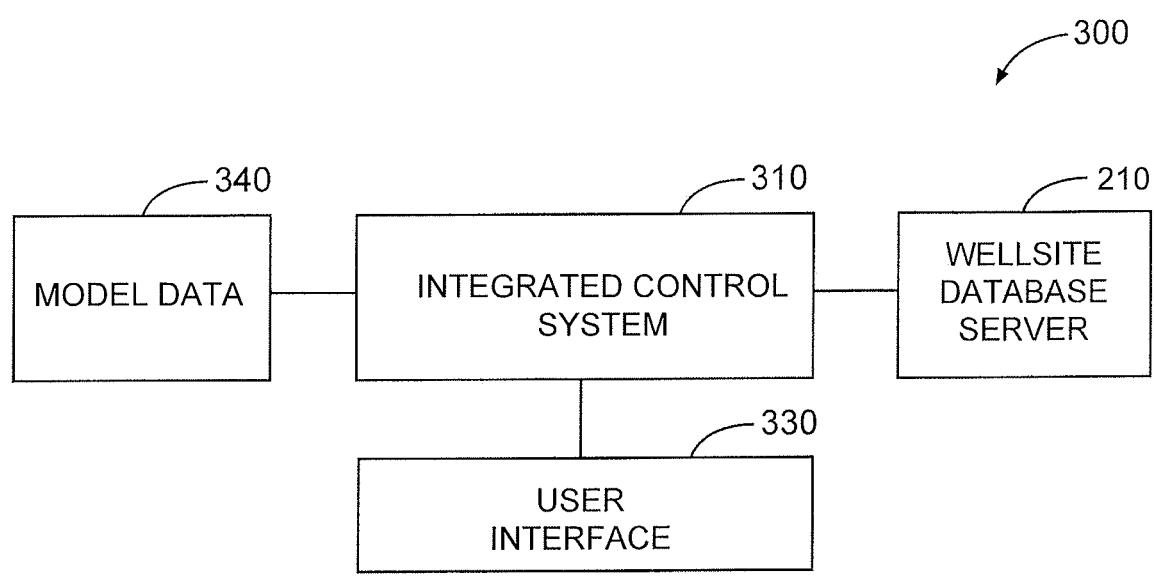
FIG. 3 is a diagram illustrating an example interface within a workflow architecture according to aspects of the present disclosure.

The IHS 106A, 108A, 112A may also implement, as noted above, an integrated control system 310 such as shown in FIG. 3 of the present embodiment to control the drilling operations. The integrated control system 310 may provide an interface to one or more suitable integrated drive electronics drives, such as a hard disk drive (HDD) or compact disc read only memory (CD ROM) drive, or to suitable universal serial bus (USB) devices through one or more USB ports. In certain embodiments, the integrated control system 310 may also provide an interface to a keyboard, a mouse, a CD-ROM drive, and/or one or more suitable devices through one or more firewire ports. A user, operator, or technician at the wellsite may access the integrated control system 310 through a user interface 330. For certain embodiments of the invention, the integrated control system 310 may also provide a network interface through which integrated control system 310 can communicate with other computers and/or devices.

In one embodiment, the integrated control system 310 may have access to a wellsite database server 210. In certain embodiments, the connection may be an Ethernet connection via an Ethernet cord. As would be appreciated by those of ordinary skill in the art, with the benefit of this disclosure, integrated control system 310 may be connected to the wellsite database server by other suitable connections, such as, for example, wireless, radio, microwave, or satellite communications. Such connections are well known to those of ordinary skill in the art and will therefore not be discussed in detail herein. In one embodiment, the integrated control system 310 may use the data in such a manner that the integrated control system 310 using software can optimize the drilling operation for the wellsite by generating a new model to use for the drilling operation. The data will be stored in a database with a common architecture, such as, for example, oracle, SQL, or other type of common architecture.

The data that is generated by the sensors at the wellsite are generally known to a person of skill in the art. These and other model data, including model data of previous control for drilling operations to conduct reservoir operations may be stored at the wellsite database server 320. The various models can identify, for example, variables for how such models are optimized for the drilling operation. For example, if the goal of the drilling operation is to minimize drift, the models can include past models used in similar reservoir operations for minimizing drift, while at the same time use the current drilling parameters and sensor information into a fuzzy logic algorithm to generate a model to use to perform the drilling operation. For instance, such parameters may include environmental parameters, downhole parameters, formation evaluation parameters, issues with resistivity or conductivity of the drilling mud and earth formations. Many other parameters may be known to one skill in the art. The model data 340 connected to the integrated control system 310 may further include the model data associated with past wellsite operation.

In one embodiment, the software produces data that may be presented to the operation personnel in a variety of visual display presentations such as a display.

The operations will occur in real-time and the data acquisition from the various sensors at the bottom hole assembly 220 or other sensors will be available in realtime at the wellsite database server 210. In one embodiment of optimizing drilling operation, the data is pushed at or near real-time enabling real-time communication and use of the data in optimizing the drilling operation. This reduces the chances of a sub-optimal control scheme that did not factor in the associated parameters of the wellsite as drilling continues at the wellsite.

As would be appreciated by those of ordinary skill in the art, with the benefit of this disclosure, the integrated control system 310 may be implemented on virtually any type of information handling system regardless of the platform being used. Moreover, one or more elements of the information handling system may be located at a remote location and connected to the other elements over a network. In a further embodiment, the information handling system may be implemented on a distributed system having a plurality of nodes. Such distributed computing systems are well known to those of ordinary skill in the art and will therefore not be discussed in detail herein.

Figure 4:
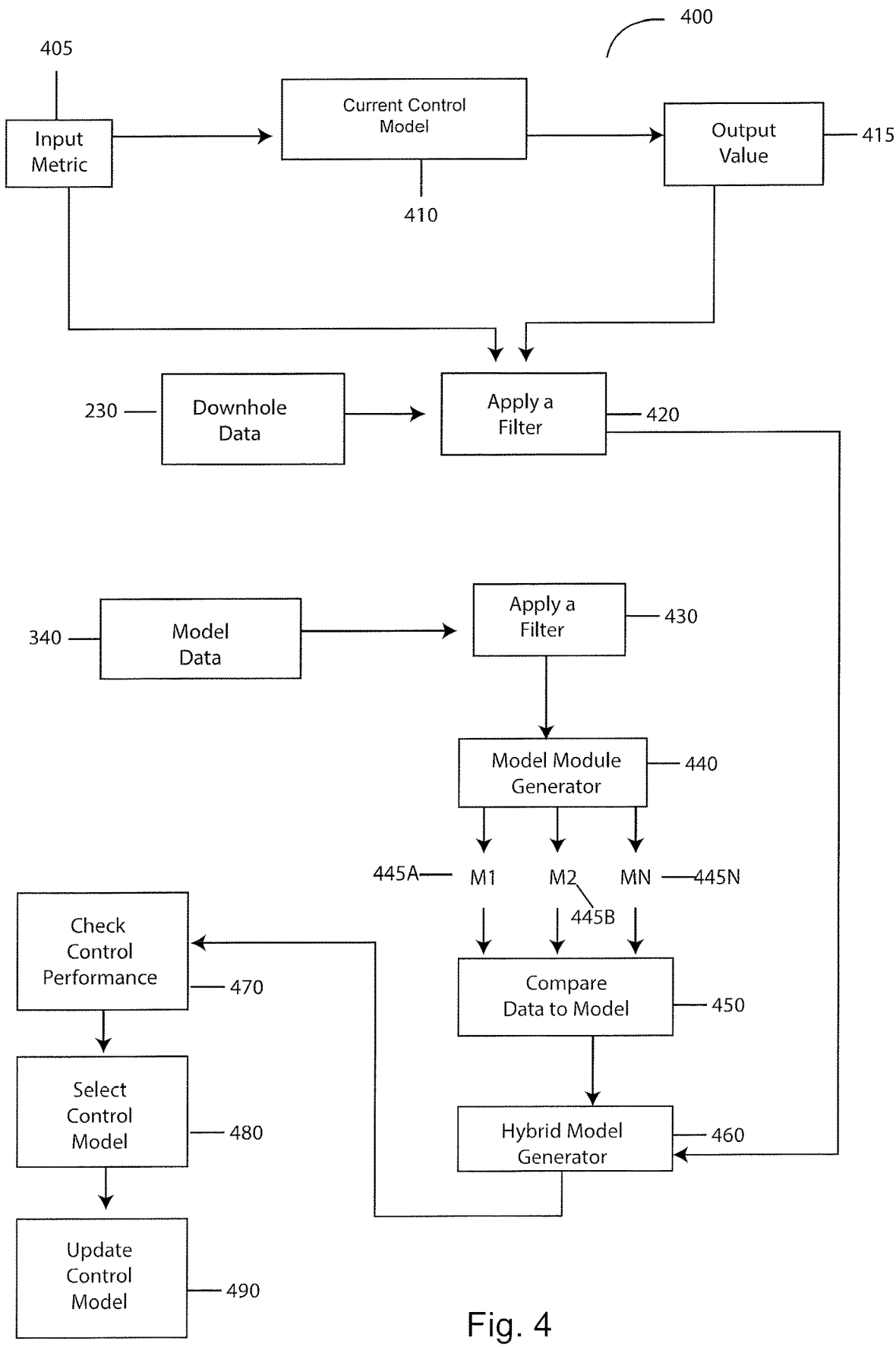
FIG. 4 shows a flow chart illustrating the exemplary process for implementing an embodiment of the present invention.

FIG. 4 is a flowchart 400 illustrating an embodiment of the present invention. At 410 is the model currently being implemented as the control scheme for the drilling operation at the wellsite. The current control model 410 includes inputs which are also values applied to the equipment at the wellsite performing the drilling operation. For example, the current control model 410 can include such inputs as the total force pulling down on the hook, hook load, and may include weight of the drillstring, drill collars, and any ancillary equipment, reduced by any force that tends to reduce that weight. The inputs can further include the revolutions per minute (RPM) of the top drive to the drill string. These inputs are intended as examples and not as limiting in the present invention. In a hydraulic fracturing well, inputs may include the injection rate, viscosity of fracturing fluid for a stimulation operation, or many other inputs known to a person having ordinary skill in the art. The current control model 410 takes the input metric 405 to produce output value 415. The output value may be, for example, drill bit RPM, rate of penetration (ROP) for drilling, or other fracture geometry or the pressure inside the downhole environment for the fracture.

The data generated from the input and output values of the existing current control model 410 can be used to generate another model which optimizes drilling operations. The downhole data 230, along with any other data regarding the current reservoir operation, and the input metrics 405 and output values 415 may optionally be ran through a filter 420, to remove values that fall outside the range of acceptable values. Such a filtering process allows the abnormal values to prevent skewing the result of the control operation. The outcome of applying the filter 420 includes filtered data and an uncertainty level, which can be determined from known techniques by one of skill in the art by the residuals of filtering which is the unfiltered data minus the filtered data.

Additionally, optionally, the data from the previous wellsite operation stored at the wellsite database server 210 may be selected to run through a physics pre-filter 430 to eliminate outliers that violate physics laws using known processes to one of ordinary skill in the art.

Figure 6:
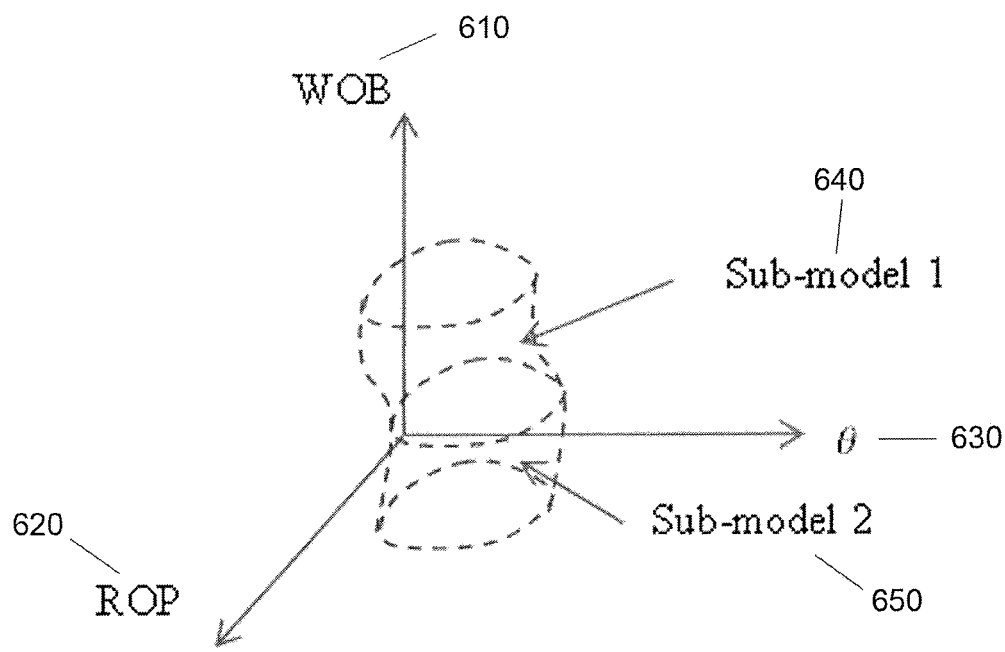
FIG. 6 provides an example for modeling of the drilling operation.

The model data 340 that has been filtered after step 430 may then be provided to a modeling module to produce a number of physical models (M1, M2, ... Mn) identified as 445A, 445B, ... 445N. These models M1, M2, ... Mn may also include model uncertainty by learning from the results of the application of the filter at step 420. For example, a Kalman filter can be constructed based on a pre-selected model and the downhole data 230. Using the uncertainty, values of uncertainty are calculated from the residual of the Kalman filter. The uncertainty matrix is updated according to the model inside Kalman filter and the model residual, which is the difference between the result of the filter on the data and the value predicted by applying the model to the downhole data 230. These models may further include multiple linear sub-models, each of which resides in a defined subspace. The models may further be determined using neural networks as known to a person of ordinary skill in the art. FIG. 6 provides an example for modeling of the drilling operation, and is further discussed below.

Next, at 450, the realtime data (downhole data 230) and any other data regarding the operation of the wellsite is compared against the model M1, M2, ... Mn. If the amount of unmodeled dynamics is found to be beyond an acceptable limitation, each model M1, M2, ... Mn is used in a hybrid model generator to obtain a hybrid model to complement the physical model generator. With either the physical model or the hybrid model, a controller can be optimized and evaluate by simulation in a closed-loop system using the feedback from the realtime data (downhole data 230) and other data regarding the operation of the wellsite.

Figure 7:
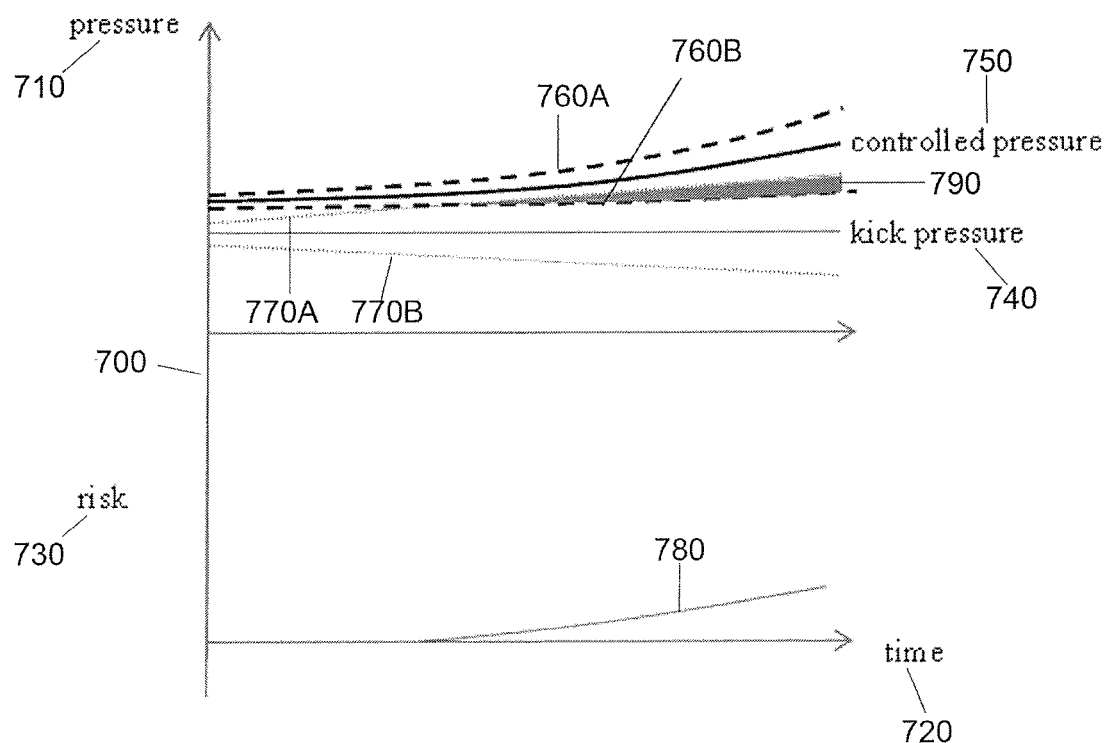
FIG. 7 is an exemplary embodiment illustrating the example of a risk evaluation for the generated models based on estimated gas kicks in evaluation of a control performance metric.

The hybrid model generator 460 may result in a test model which when applied, can simulate data for the wellsite operation if applied to the wellsite for control. This data can be used to measure control performance 470. For example, once M1 has been fed through the hybrid model generator 460, the resulting model can be evaluated to check its control performance based on the drift of eigenvalues of the system as a performance metric. The remaining models, M2 ... MN, can also be evaluated in the same manner as described for M1. Since a better model and control operation may lead to less change in system eigenvalues, this can result in an identification or ranking for the models based on the performance metric desired for each of the generated models. For example, in another embodiment, the performance can be evaluated using a risk function. The risk function may be the possibility of a gas kick in the future when performing a drilling operation, or it may be the average possibility of a gas kick over time periods determined in the future. FIG. 7, explained further below, is an exemplary embodiment illustrating the example of a risk evaluation for the generated models based on estimated gas kicks in evaluation of a control performance metric. With a model that results in the best performance based on the metric, the control operation can be optimized based on the model and further reduce the uncertainty bounds, thus yielding a smaller value of risk associated with the performance metric.

The system may next identify and select the control model 480 associated with the performance metric desired, or the most improved control model associated for ongoing wellsite operation to be the next control model to use for the operation. There may be several control models associated with each of the generated models, and each of the control models may be designed for a certain specific uncertainty range. For models with multiple sub-models, the control model is a combination of sub-control models associated with each sub-model. The control model may then be updated with the selected control model.

As described in accordance with the above, the selection and updating process of the control model may involve the use of noise-filtered input metric 405 and output value 415 in addition to the downhole data 230, and by use of the realtime data, improves the model estimates for the current state of the system. For example, in the embodiment of risk assessment, the update may also involve known risk values, such as, for example, a determination that the current state of the drilling operation is in a riskier space which may result in a gas kick in the near future. This factor could be then used in the next iteration of updating the model 400 such that the optimization for the controller and model further reduces the risks associated with the identified metric.

As the time spent on a wellsite to make these computations may require that the wellsite stop operation, or require significant computational burdens, it may be undesirable to repeat the process of generating a new control model periodically. In another embodiment of the present invention, there could be a monitoring module that identifies, based on predetermined criteria, whether the control model needs to be updated. The monitoring module may optionally monitor the incoming data and perform some simplified control performance evaluation. For example, if the performance metric identified for a particular wellsite operation is the eigenvalue drift, the monitoring module may learn the eigenvalue changes from the current data. Based on a preset limit, if the eigenvalue change exceeds the limit, the process of updating the control model can be triggered. As another example, if risk evaluation is used as the performance metric, then the monitoring module could continuously propagate the risk growth on multiple models, and compare the risk with a threshold value. Alternatively, the monitoring module may simply compare the data with some dynamic templates on risky events, and apply a fuzzy logic algorithm to determine the possibility of occurrence of risky events. If the risk exceeds the limit, the process of updating the control model can be triggered.

Figure 5:
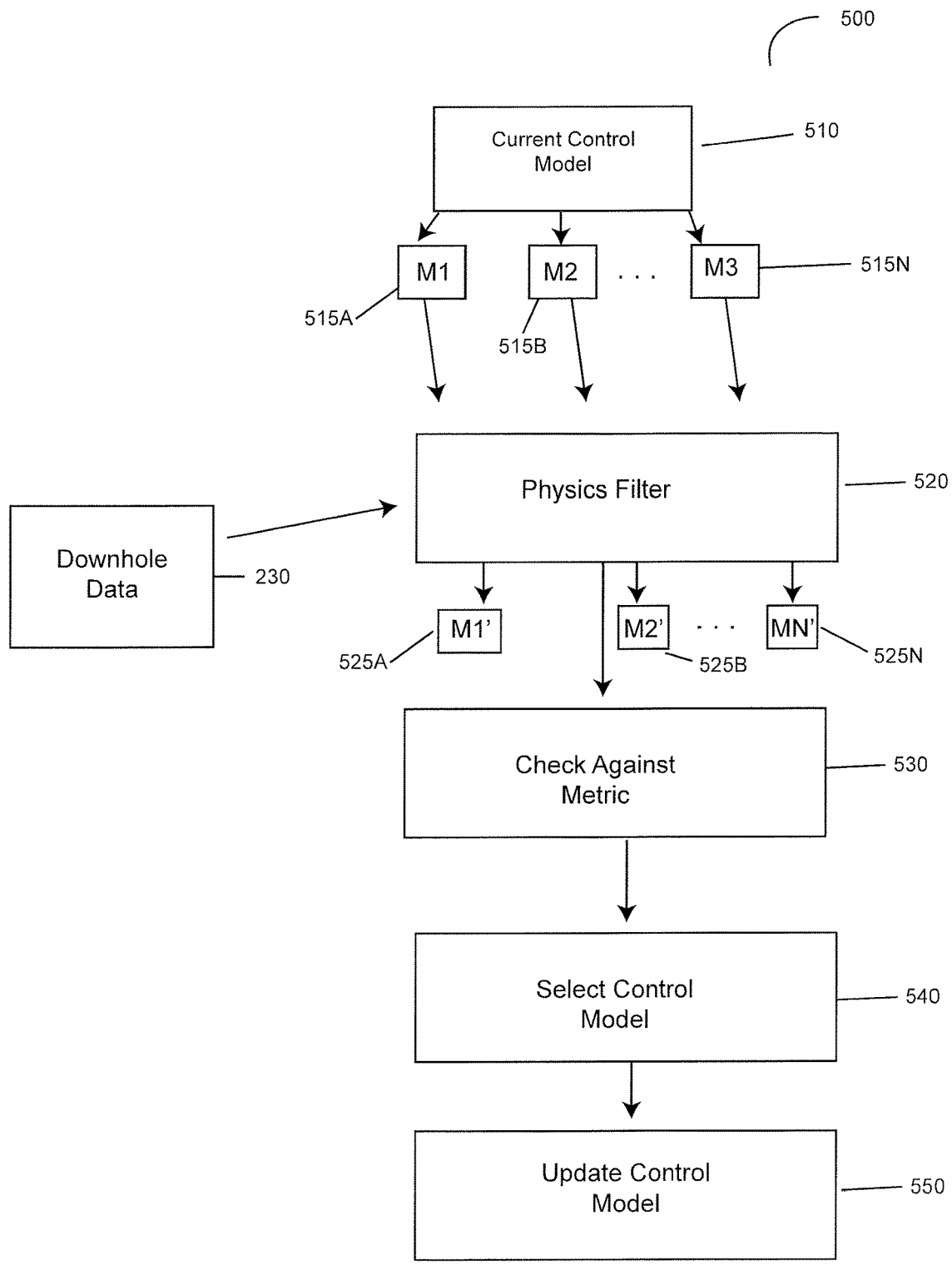
FIG. 5 shows a flow chart illustrating another exemplary process for implementing an embodiment of the present invention.

In yet another embodiment of the present invention, shown in FIG. 5, the current control model 510 is updated without identifying or fitting a model from the downhole data 230 or surface data. Existing models (M1, M2, ... Mn) labeled 515A, 515B, ... 515N are the models that have been stored and extracted from the wellsite database server. These models M1, M2, ... Mn labeled 515A, 515B, ... 515N may be the same models as shown in FIG. 4. They can be pre-computed and stored in the wellsite database server 210. The physical model of the current control is subtracted, if known, from the M1, M2, . . . Mn labeled 515A, 515B, . . . 515N. The outcome is the difference between the models in the wellsite database server 210 and the physical models M1, M2, . . . Mn labeled 515A, 515B, . . . 515N. The M1, M2, . . . Mn labeled 515A, 515B, . . . 515N can also be submitted through a physics filter 520. The outcome of the difference between the models may be designated as M1', M2', . . . Mn' 525A, 525B, . . . 525N. Optionally, the downhole data 230 and the surface data can be fed through the physics filter 520. The remainder from the result of the physics filter 520 is the unmodeled dynamics. The unmodeled dynamics can then be evaluated using each of the M1', M2', . . . Mn' models. The model residuals, which are defined by the difference between the true output data and predicted output data by the model, are collected and checked against metrics 530. For example, one such metric that can be applied is the variance of model residuals as a tool to evaluate the model, because an optimized model means good predictability and smaller residuals. An improved control model can then be identified and the control model can be chosen 540 to update the control model 550 for the system. Additionally, as described in the prior embodiment, the uncertainty values of the range can still be used as a measure to further optimize the control model.

FIG. 6 provides an example for modeling of the drilling operation. The factors considered for the models shown in FIG. 6 are weight-on-bit (WOB) 610, rate of penetration 620 (ROP), and horizontal angle (θ) 630 in three dimensions. The weight-on-bit 610 may optionally be replaced by density of drilling fluids, and the rate of penetration may be replaced for example by another metric such as viscosity of drilling fluids. Other possible metrics can be used instead of the metrics shown in FIG. 6, which are intended as illustrative. Models depicted include just two examples, but the present invention includes the application of any number of models. In the example in FIG. 6, sub-model 1 640 and sub-model 2 650 are illustrated to show divided operating spaces for the multiple physical models. The feasible operating region is depicted by the column with dashed lines. This feasible region is divided into two subspaces, within each of which a linear model can fairly represent the drilling dynamics for the wellsite operation.

FIG. 7 is an exemplary embodiment illustrating the example of a risk evaluation for the generated models based on estimated gas kicks in evaluation of a control performance metric. The graph 700 illustrates the embodiment for a gas kick risk evaluation with parameters for pressure 710, time 720, and risk 730. The solid line 740 is the estimated gas kick pressure and the curved line 750 is the controlled pressure regulated by the controller. The dotted lines 760A and 760B and dotted lines 770A and 770B are the uncertainty ranges of the gas kick and controlled pressure. The shaded region 790 between the lines marked 770A and 760B is where the gas kick pressure is possible to be greater than the controlled pressure and gas kicks are possible. The risk curve 780 is plotted at the bottom based on the overlapping area between the two uncertainty curves. With the use of the present invention, a model control can improve upon the drilling process based on the model and reduce the uncertainty bounds, yielding a smaller value of risk based on the function of the maximum or the average value of a potential gas kick risk.

In certain embodiments, a system and method is described above that is able to utilize large and complex data sets of previous wellsite operations as well as model information and data from the current wellsite operation in realtime to optimize the control model for the drilling operation. The models and associated controls are determined from the large and complex data sets, and the control which results in an optimization in accordance with the metrics defined is chosen to further perform the desired operation, such as drilling operation for the wellsite.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method for optimizing control of drilling operations, comprising:
    implementing a control model for a drilling operation at a wellsite;
    collecting one or more input values, one or more output values or both as operation data at the wellsite based on operation of the wellsite during a drilling operation;
    generating one or more physical models based, at least in part, on the operation data to optimize the drilling operation;
    comparing at least realtime data regarding operation of the wellsite against the one or more physical models;
    generating, based on the comparison, a hybrid model for each of the one or more physical models, wherein both the one or more physical models and filtered data with an uncertainty level from the control model function as inputs for a hybrid model generator;
    evaluating one or more hybrid models to measure a control performance of the one or more hybrid models based on a drift of eigenvalues as a performance metric;
    selecting a model of the one or more hybrid models that provides an optimized performance result based on the evaluating;
    updating the control model with the selected model, wherein updating the control model optimizes the drilling operation based, at least in part, on the realtime data; and
    operating a device at the wellsite according to the updated control model.

2. The method of claim 1, further comprising performing a filter of the operation data to identify a filtered model data for use in generating the one or more physical models.

3. The method of claim 1, further comprising identifying an uncertainty range, wherein the one or more physical models are further based in part on the uncertainty range.

4. The method of claim 1, further wherein the performance metric comprises one of gas kick pressure, weighton-bit, revolutions per minute of the drill bit, rate of penetration, drilling fluid flow rate, hook load.

5. The method of claim 3, further comprising reducing the uncertainty range to a smaller value of risk associated with the performance metric.

6. The method of claim 1, further comprising storing the operation data in a database.

7. The method of claim 1, further comprising a monitoring module, wherein the monitoring module determines whether the update to the control model is needed based on a monitoring metric.

8. The method of claim 1, further wherein the performance metric comprises a risk function.

9. A non-transitory computer-readable medium storing instructions that, when executed by data processing apparatus, perform operations comprising:
    implementing a control model for a drilling operation at a wellsite;
    collecting one or more input values, one or more output values or both as operation data at a wellsite based on operation of the wellsite during a drilling operation;
    generating one or more physical models based, at least in part, on the operation data to optimize the drilling operation;
    comparing at least realtime data regarding operation of the wellsite against the one or more physical models;
    generating, based on the comparison, a hybrid model for each of the one or more physical models, wherein both the one or more physical models and filtered data with an uncertainty level from the control model function as inputs for a hybrid model generator;
    evaluating one or more hybrid models to measure a control performance of the one or more hybrid models based on a drift of eigenvalues as a performance metric;
    selecting a model of the one or more hybrid models that provides an optimized performance result based on the evaluating;
    updating the control model with the selected model, wherein updating the control model optimizes the drilling operation based, at least in part, on the realtime data; and
    operating a device at the wellsite according to the updated control model.

10. The computer-readable medium of claim 9, further comprising performing a filter of the operation data to identify a filtered model data for use in generating the one or more physical models.

11. The computer-readable medium of claim 9, further comprising identifying an uncertainty range, wherein one or more of the one or more physical models are further based in part on the uncertainty range.

12. The computer-readable medium of claim 11, further comprising reducing the uncertainty range to a smaller value of risk associated with the performance metric.

13. The computer-readable medium of claim 9, further wherein the performance metric comprises one of gas kick pressure, weight-on-bit, revolutions per minute of the drill bit, rate of penetration, drilling fluid flow rate, hook load.

14. The computer-readable medium of claim 9, further comprising a monitoring module, wherein the monitoring module determines whether the update to the control model is needed based on a monitoring metric.

15. The computer-readable medium of claim 9, further comprising storing the operation data in a database.

16. The computer-readable medium of claim 9, further wherein the performance metric comprises a risk function.

17. A computing system comprising:
    a database, wherein the database comprises operation data based on operation of the wellsite during a drilling operation; and
    a processor coupled to a memory, wherein the memory stores one or more instructions that, when executed by the processor, cause the processor to:
        implement a control model for a drilling operation at a wellsite;
        collect one or more input values, one or more output values or both as operation data at the wellsite based on operation of the wellsite during a drilling operation;
        generate one or more physical models based, at least in part, on the operation data to optimize the drilling operation;
        comparing at least realtime data regarding operation of the wellsite against the one or more physical models;
        generate, based on the comparison, one or more resulting models wherein both the one or more physical models and filtered data with an uncertainty level from the control model function as inputs for a hybrid model generator;
        evaluating each of the one or more resulting models to check a control performance of each of the one or more resulting models based on a drift of eigenvalues as a performance metric;
        selecting a model of the one or more resulting models that provides an optimized performance result based on the evaluating the one or more resulting models;
        updating a control model with the selected model, wherein updating the control model optimizes the drilling operation based, at least in part, on the realtime data; and
        controlling operation of a device at the wellsite based on the updated control model.

18. The computing system of claim 17, wherein the one or more instructions that, when executed by the process, further cause the processor to pass the operation data through a filter to identify a filtered model data for the hybrid model generator.

19. The computing system of claim 17, wherein the one or more instructions that, when executed by the process, further cause the processor to pass the one or more physical models through a filter to identify a filtered model data for the hybrid model generator.

20. The computing system of claim 17, wherein the one or more instructions that, when executed by the process, further cause the processor to identify an uncertainty range, wherein the updated control model is further based in part on the uncertainty range.

21. The computing system of claim 20, wherein the one or more instructions that, when executed by the process, further cause the processor to reduce the uncertainty range to a smaller value of risk associated with the performance metric.

* * * * *